(12) United States Patent
Yang et al.

(10) Patent No.: US 10,013,105 B2
(45) Date of Patent: Jul. 3, 2018

(54) TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Kangpeng Yang, Xiamen (CN); Zhiwei Zheng, Xiamen (CN); Weipeng Wang, Xiamen (CN); Yumin Xu, Xiamen (CN); Jianxun Wang, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 109 days.

(21) Appl. No.: 15/362,834

(22) Filed: Nov. 29, 2016

(65) Prior Publication Data
US 2017/0123581 A1 May 4, 2017

(30) Foreign Application Priority Data
Jun. 30, 2016 (CN) .......................... 2016 1 0504242

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04111* (2013.01)

(58) Field of Classification Search
CPC ...... G06F 3/0416; G06F 3/0412; G06F 3/044; G06F 3/041; G06F 2203/04111
See application file for complete search history.

(56) References Cited

U.S. PATENT DOCUMENTS

| | | | | |
|---|---|---|---|---|
| 9,690,416 B2* | 6/2017 | Yao | ........................ | G06F 3/0416 |
| 9,851,832 B2* | 12/2017 | Yang | ...................... | G06F 3/0416 |
| 2011/0310036 A1* | 12/2011 | Juan | ...................... | G06F 3/0412 345/173 |
| 2014/0043274 A1* | 2/2014 | Yao | ........................ | G06F 3/0416 345/173 |
| 2016/0291726 A1* | 10/2016 | Li | ............................ | G06F 3/044 |
| 2016/0299614 A1* | 10/2016 | Yang | ........................ | G06F 3/044 |

FOREIGN PATENT DOCUMENTS

CN 102955637 B 9/2015

* cited by examiner

*Primary Examiner* — Tom Sheng
(74) *Attorney, Agent, or Firm* — Kilpatrick Townsend & Stockton LLP

(57) ABSTRACT

A touch display device is provided. The device includes an array substrate and a color substrate opposite to the array substrate; the array substrate is provided with a plurality of touch driving electrodes; a plurality of sub-pixels defined by a plurality of source lines and a plurality of gate lines insulated from and intersected with the plurality of source lines. Sub-pixels of each row are driven in a time division manner by corresponding two of the plurality of gate lines. The plurality of source lines include data lines and touch driving lines. Adjacent two sub-pixels, connected to a same data line, in a same row are connected to two different gate lines. Adjacent two sub-pixels, connected to a same gate line, in a same row are connected to two different data lines.

16 Claims, 14 Drawing Sheets

TOUCH DISPLAY DEVICE

CROSS-REFERENCE TO RELATED APPLICATIONS

This application claims priority to a Chinese patent application No. 201610504242.3, filed on Jun. 30, 2016, and entitled "Touch Display Device", the disclosure of which is incorporated herein by reference in entirety.

TECHNICAL FIELD

The present disclosure relates to the field of display technologies, in particular to a touch display device.

BACKGROUND

With the development of electronic technologies, functions of display devices are on longer limited to receiving and displaying video signals. Nowadays, the display device has been integrated with a touch function, so that a control instruction can be input into the display device according to a touch operation performed by an operator on the display device.

Display devices of the related art integrated with a touch function are divided into an add-on touch screen, an on-cell touch screen and an in-cell touch screen according to structures of the display devices. However, in any of the existing touch screens with the above various structures, touch signal lines connecting with touch electrodes are necessary. In touch display devices of existing technology, one gate line is used by each row of pixels and one data line is used by each column of pixels. In addition, a single metallic layer is also required for preparing touch lines so as to connect with touch driving electrodes corresponding to the touch lines for providing touch driving signals. Thus, a process for fabricating touch lines is additionally added, thereby leading to an increasing production cost for the touch display device.

SUMMARY

The present disclosure provides a touch display device to achieve an aim of simplifying process and reducing cost.

Embodiments of the present invention provide a touch display device including: an array substrate and a color filter substrate disposed opposite to each other. The array substrate is provided with a plurality of touch driving electrodes.

The touch display device further comprises a plurality of pixel units disposed in a matrix manner, and a plurality of sub-pixels defined by a plurality of source lines and a plurality of gate lines. The plurality of gate lines are insulated from and intersected with the plurality of source lines. Each row of sub-pixels is driven in a time division manner by corresponding two of the plurality of gate lines.

The plurality of source lines comprise data lines and touch driving lines. The touch driving lines are connected with the touch driving electrodes corresponding to the touch driving lines and provide touch scan signals to the touch driving electrodes. The data lines are used for providing data signals for the respective sub-pixels. In each row of sub-pixels, two adjacent sub-pixels connected to a same data line are connected with different gate lines, and two adjacent sub-pixels connected to a same gate line are connected with different the data lines.

DETAILED DESCRIPTION

Figure 1A:
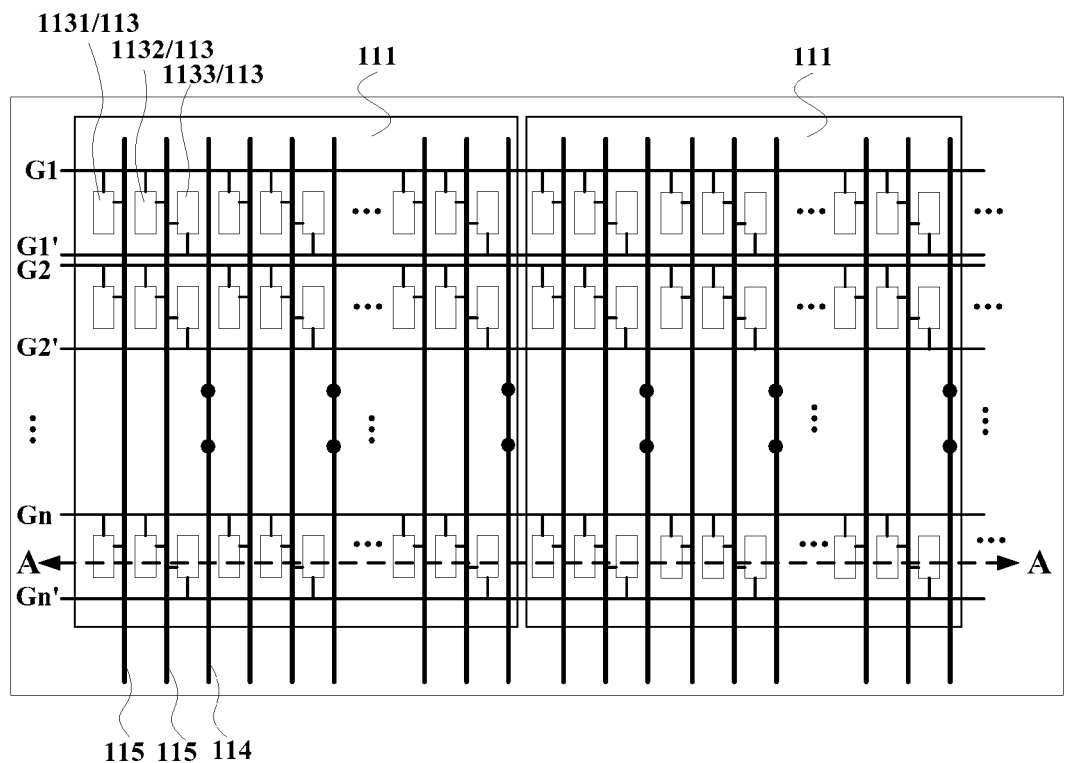
FIG. 1A is a schematic top view showing a structure of a touch display panel according to embodiments of the present invention.

The present disclosure will be described in detail below in combination with accompanying drawings and specific embodiments. Note that, the specific embodiments disclosed herein serves exclusively for explaining the present disclosure, rather than limiting the present disclosure. Also to be noted is that, for easy description, only those parts relevant to the present disclosure rather than all parts are represented schematically in the accompanying drawings.

Embodiments of the present invention provide a touch display device. The touch display device includes an array substrate and a color filter substrate opposite to the array substrate. The array substrate is provided with a plurality of touch driving electrodes. The touch display device includes a plurality of pixel units arranged in a matrix manner. A plurality of sub-pixels are defined by a plurality of source lines and a plurality of gate lines insulated from and intersected with the plurality of source lines. Each row of sub-pixels is driven by two gate lines from the plurality of gate lines in a time division manner.

The plurality of source lines include data lines and touch driving lines. The touch driving lines are electrically connected with touch driving electrodes corresponding to the touch driving lines and provide touch scan signals to the touch driving electrodes. The data lines are used for providing data signals for respective sub-pixels. Since a portion of the source lines are used as touch driving lines and the remaining source lines are used as data lines, it is not necessary to provide a separate data line for each sub-pixel. Therefore, a same data line can be used for providing data signals to any two adjacent sub-pixels. In order to avoid display driving fault, two adjacent sub-pixels, arranged in the same row and connected to the same data line, are connected with different gate lines, and two adjacent sub-pixels connected with the same gate line are connected with different data lines.

Each of the plurality of sub-pixels includes a thin film transistor, a source electrode of the thin film transistor is electrically connected with a respective data line, a drain electrode of the thin film transistor is electrically connected with a pixel electrode of a sub-pixel and a gate electrode of the thin film transistor is electrically connected with a respective gate line. The gate line is used to provide a scan signal to the sub-pixel connected with the gate line. The scan signal controls the turning on and turning off of the thin film transistor of the sub-pixel. When the thing film transistor is turned on, if a data signal is provided to the data line at that moment, a data voltage is provided to pixel electrode of the sub-pixel to form a voltage difference between the common electrode of the sub-pixel. This voltage difference can control the rotation of the liquid crystal molecules to achieve image display in a sub-pixel area. Because each row of sub-pixels are driven by two gate lines, the sub-pixels, arranged in the same row and connected with the same data line, are configured to be connected with different gate lines respectively. The gate lines are configured to provide scan signals to the sub-pixels to turn on the thin film transistor of each sub-pixel. In order to avoiding the same one data line from providing a data signal to multiple sub-pixels, the sub-pixels, connected with the same data line, are configured to be connected with the different gate lines, and the sub-pixels, connected with the same gate line, are configured to connected with the different data lines.

In the touch display device according to the present disclosure, two gate lines are disposed for each row of sub-pixels and sub-pixels in the same row are driven by two gate lines in a time division manner, therefore, a source line may not be separately arranged for each sub-pixel. The remaining source lines can be used as touch driving lines so as to provide touch scanning signals to touch driving electrodes. The above arrangement can avoid separately arranging a metallic layer to fabricate touch driving lines, and hence the number of process is simplified, the production rate is increased and the production cost of the touch display device is reduced.

Technical solutions in embodiments of the present invention will be described clearly and completely below in combination with accompanying drawings.

Figure 1B:
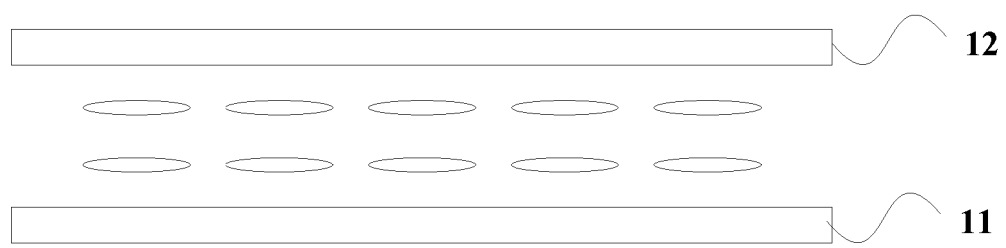
FIG. 1B is a schematic view showing a cross-sectional structure taken along line AA in FIG. 1A.

FIG. 1A is a schematic top view showing a structure of a touch display panel according to embodiments of the present invention. FIG. 1B is a schematic view showing a cross-sectional structure taken along line AA in FIG. 1A. As illustrated in FIG. 1A and FIG. 1B, a touch display panel includes an array substrate 11 and a color filter substrate 12 opposite to the array substrate 11. The array substrate 11 is provided with a plurality of touch driving electrode 111. A plurality of sub-pixels are defined by a plurality of gate lines and a plurality of source lines insulated from and intersected with the plurality of gate lines. Each row of sub-pixels is driven by two gate lines in a time division manner. Referring to FIG. 1A, the first row of sub-pixels 113 are respectively driven by a gate line G1 and a gate line G1' in a time division manner. The second row of sub-pixels 113 are respectively driven by a gate line G2 and a gate line G2' in a time division manner. The third row of sub-pixels 113 are respectively driven by a gate line G3 and a gate line G3'. The n-th row of sub-pixels 113 are respectively driven by a gate line Gn and a gate line Gn' in a time division manner.

Illustratively, in FIG. 1A, touch driving lines are spaced apart from three sub-pixels with each other in each row in a direction parallel to gate lines. Referring to FIG. 1A, sub-pixel 1131, sub-pixel 1132 and sub-pixel 1133 are provided between any two adjacent touch driving lines 114. A source line located at a side of the sub-pixel 1133 is a touch driving line 114, and the touch driving line 114 is electrically connected with a respective touch driving electrode 111 and is used for providing a touch scanning signal to the touch driving electrode 111. Source lines located at a side of sub-pixel 1131 and sub-pixel 1132 are date line 115 configured for providing data signals to respective sub-pixels, such as sub-pixel 1131, sub-pixel 1132 and sub-pixel 1133. Since the source line located at the side of the sub-pixel 1133 is remained and is used as the touch driving line 114, it is required that the same source line is shared by the sub-pixel 1132 and sub-pixel 1133 and is used as a data line 115. Since the sub-pixel 1132 and sub-pixel 1133 share the same one data line 115, the sub-pixel 1132 and sub-pixel 1133 are driven by different gate lines. Referring to FIG. 1A, the sub-pixel 1131 uses a separate source line as a data line 115, the sub-pixel 1132 and sub-pixel 1133 share one source line as a data line 115.

Figure 1C:
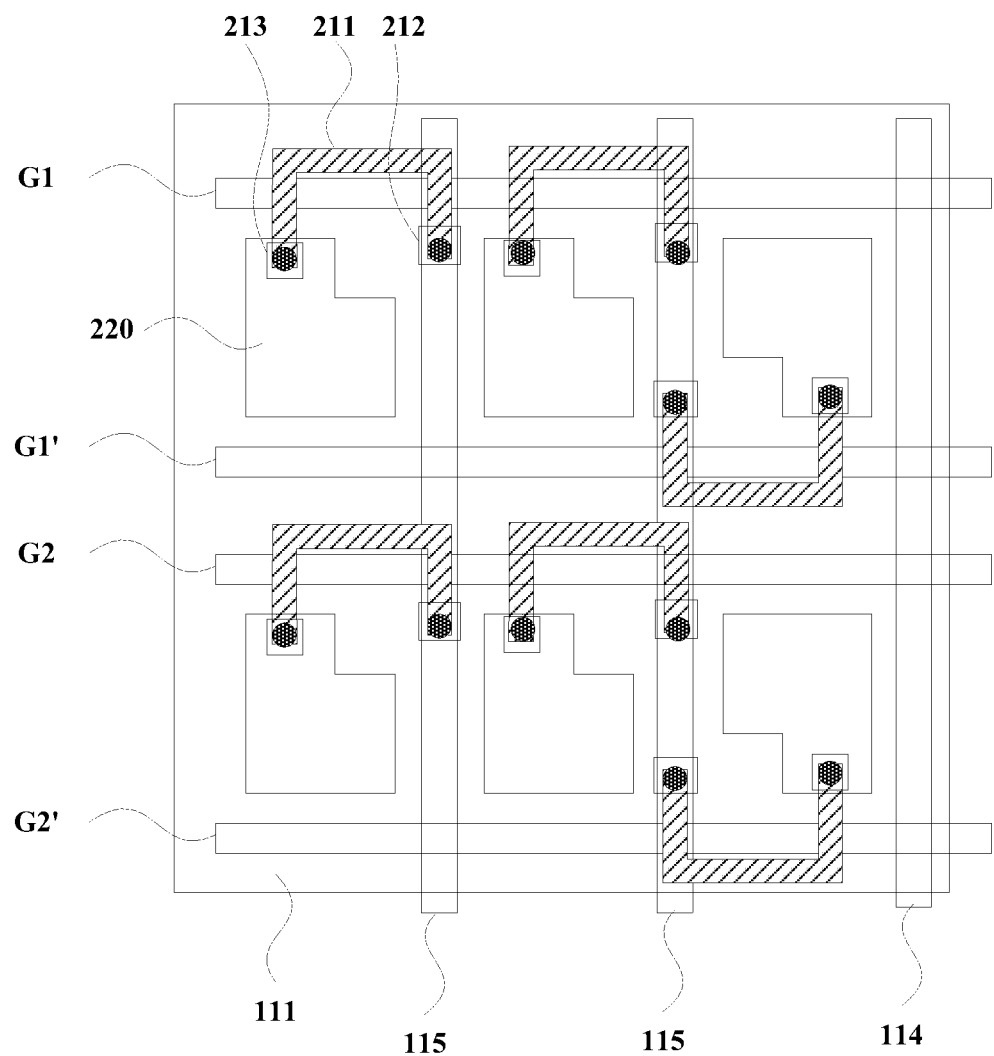
FIG. 1C is a partially enlarged view of FIG. 1A.

FIG. 1C is a partially enlarged view of FIG. 1A, as shown in FIG. 1C, each sub-pixel 113 includes a thin film transistor 210. In the embodiments, optionally, an active layer 211 of the thin film transistor 210 is U-shaped. One end (i.e. a source region) of the active layer 211 of the thin film transistor 210 is connected with a data line 115 via a source electrode 212, the other end (i.e. a drain region) of the active layer 211 of the thin film transistor 210 is electrically connected with a pixel electrode 220 via a drain electrode 213. The active layer 211 of the thin film transistor 210 intersects with a gate line G1 twice, and hence a leakage current can be effectively reduced.

Figure 2:
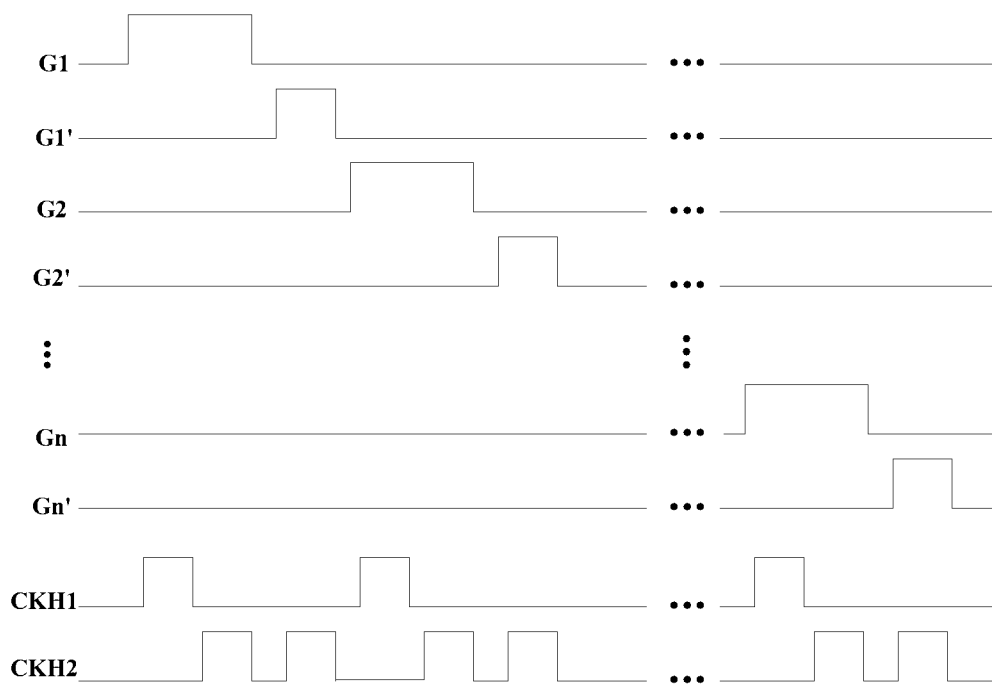
FIG. 2 is a schematic driving time sequence diagram of the touch display device as shown in FIG. 1A.

FIG. 2 is a schematic driving time sequence diagram of the touch display panel in FIG. 1A. The driving period of each frame is described in combination with FIG. 2 and FIG. 1A. Note that, in the embodiment of the present disclosure, each of data signals can be inputted to respective one of data lines controlled by a plurality of clock signals in a time division manner. For example, by controlling the levels (i.e. remaining at a high level or a low level) of the plurality of clock signals so as to control the turning on and turning off of switching components which are connected with respective data lines, thereby it is realized that each of the data signals is inputted to respective one of data lines.

At a first stage, the gate line G1 is at a high level, and when a first clock signal CKH1 is at a high level, data signals are inputted to the first row of sub-pixels 1131 by the data lines 115 so as to drive the first row of sub-pixels 1131 for display.

At a second stage, the gate line G1 is at a high level, and when a second clock signal CKH2 is at a high level, data signals are inputted to the first row of sub-pixels 1132 by the data lines 115 so as to drive the first row of sub-pixels 1132 for display. Meanwhile, since a gate line G1' is at a low level, the sub-pixel 1133s connected with gate line G1' does not receive data signals provided by the data lines 115.

At a third stage, the gate line G1' is at a high level, and when the second clock signal CKH2 is at a high level, data signals are inputted to the first row of sub-pixels 1133 by the data lines 115 so as to drive the first row of sub-pixels 1133 for display. Meanwhile, since the gate line G1 is at a low level, the sub-pixels 1132 connected with the gate line G1 do not receive data signals provided by the data lines 115.

So far, display of the first row of sub-pixels is finished. Similarly, within a driving period of one frame picture, display and driving from the second row of sub-pixels to the n-th row of sub-pixels are controlled by the above three stages to sequentially complete the display of each row of the sub-pixels.

Figure 3:
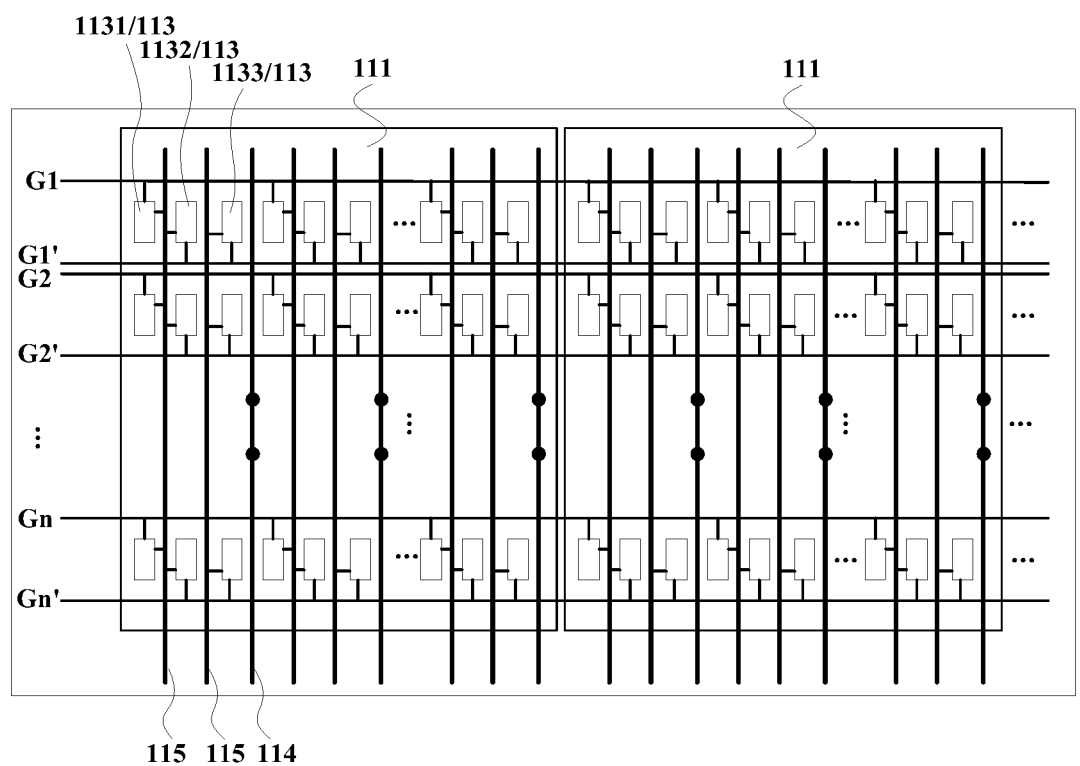
FIG. 3 is a schematic top view showing a structure of another touch display panel according to embodiments of the present invention.

FIG. 3 is a schematic top view showing a structure of another touch display panel according to embodiments of the present invention. As show in FIG. 3, each row of sub-pixels 113 are driven by two gate lines in a time division manner. The first row of sub-pixels 113 is driven by gate lines G1 and G1' in a time division manner respectively. The second row of sub-pixels 113 is driven by gate lines G2 and G2' in a time division manner. The third row of sub-pixels 113 is driven by gate lines G3 and G3' in a time division manner. The n-th row of sub-pixels 113 is driven by gate lines Gn and Gn' in a time division manner. Being different from FIG. 1A, in FIG. 3, a sub-pixel 1131 and a sub-pixel 1132 share a data line 115, a sub-pixel 1133 exclusively uses a respective data line 115. A source line at a side of the sub-pixel 1133 is still used as a touch driving line 114. The gate line G1 provides a scan signal to the first row of sub-pixels 1131. The gate line G1' provides a scan signal to the first row of sub-pixels 1132 and the first row of sub-pixels 1133. The gate line G2 provides a scan signal to the second row of sub-pixels 1131, the gate line G2' provides a scan signal to the second row of sub-pixels 1132 and the second row of sub-pixels 1133. The gate line Gn provides a scan signal to the n-th row of sub-pixels 1131, the gate line Gn' provides a scan signal to the n-th row of sub-pixels 1132 and the n-th row of sub-pixel 1133s.

Figure 4:
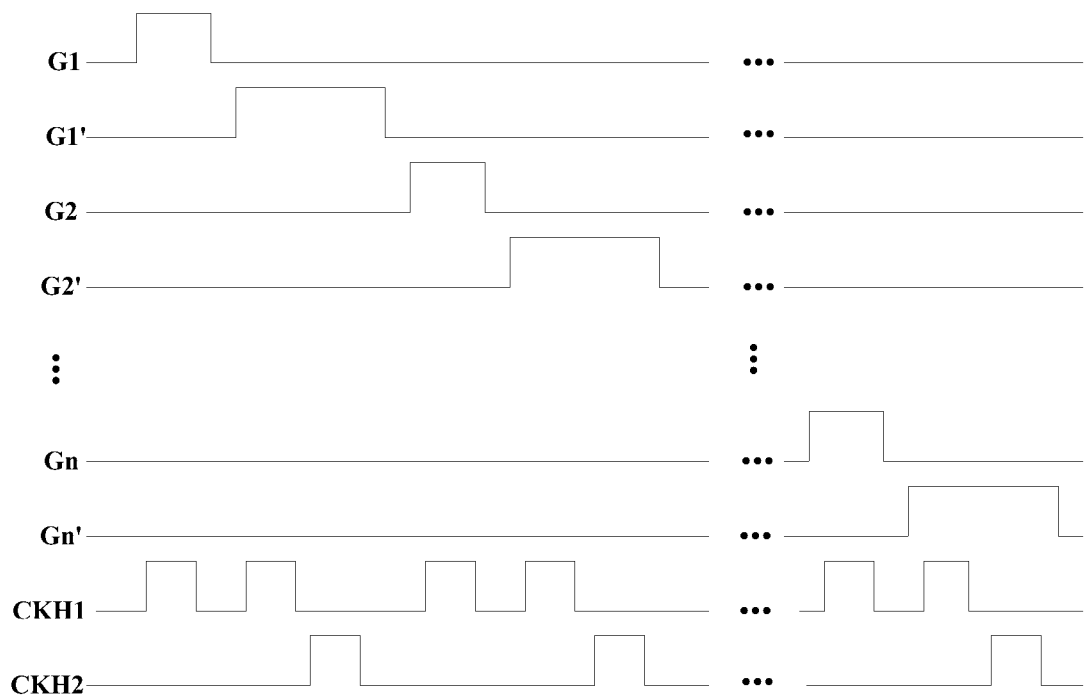
FIG. 4 is a schematic driving time sequence diagram of the touch display device as shown in FIG. 3.

FIG. 4 is a schematic driving time sequence diagram of the touch display device in FIG. 3. A driving period of each frame is described in combination with FIG. 3 and FIG. 4.

At a first stage, a gate line G1 is at a high level, and when a first clock signal CKH1 is at a high level, data signals are inputted to the first row of sub-pixels 1131 by the data lines 115 so as to drive the first row of sub-pixels 1131 for display. Meanwhile, although both a sub-pixel 1133 and a sub-pixel 1132 share a data line 115, but a gate line G1' is at a low level, the sub-pixel s1132 do not receive the data signal provided by the data line 115.

At a second stage, the gate line G1' is at a high level, and when the first clock signal CKH1 is at a high level, data signals are inputted into the first row of sub-pixels 1132 by the data lines 115 so as to drive the first row of sub-pixels 1132 for display. Meanwhile, the gate line G1 is at low level, so the sub-pixels 1131 do not receive the data signals provided by the data lines 115.

At a third stage, the gate line G1' is at a high level, and when a second clock signal CKH2 is at a high level, data signals are inputted into the first row of sub-pixels 1133 so as to drive the first row of sub-pixels 1133 for display.

So far, display of the first row of sub-pixels is completed. Similarly, within a driving period of one frame picture, display and driving from the second row of sub-pixels to the n-th row of sub-pixels are controlled by the above three stages to sequentially complete the display of each row of the sub-pixels.

Note that, FIG. 1A and FIG. 3 only illustrate a case that the touch driving line is spaced apart from three sub-pixels, which is not limited to the disclosure. The arrangements of touch driving lines of the present disclosure have various implementations.

Figure 5:
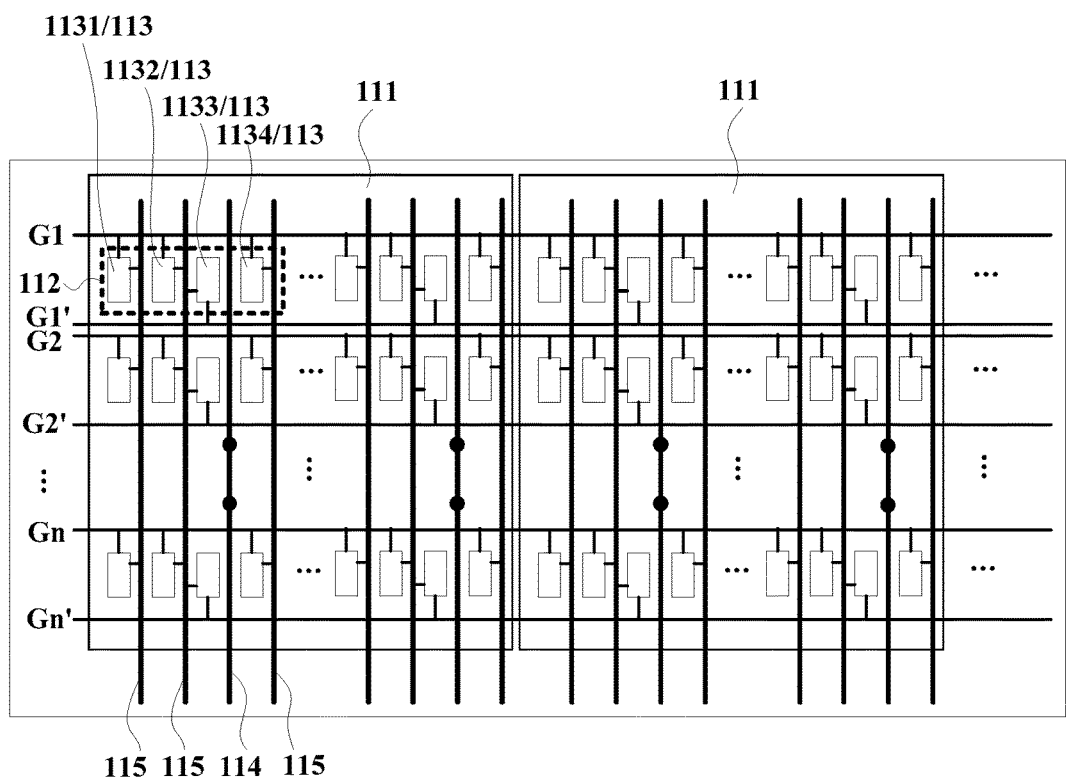
FIG. 5 is a schematic top view showing a structure of still another touch display panel according to embodiments of the present invention.

FIG. 5 is a schematic top view showing a structure of still another touch display panel according to embodiments of the present invention. As illustrated in FIG. 5, each row of sub-pixels 113 is driven by two gate lines in a time division manner. The first row of sub-pixels 113 is driven by a gate line G1 and a gate line G1' in a time division manner. The second row of sub-pixels 113 is driven by a gate line G2 and a gate line G2' in a time division manner. The third row of sub-pixels 113 is driven by a gate line G3 and a gate line G3' in a time division manner. The n-th row of sub-pixels 113 is driven by a gate line Gn and a gate line Gn' in a time division manner. A touch display device according to embodiments of the disclosure includes a plurality of pixel units 112 arranged in a matrix manner. Each of the plurality of pixel units 112 includes a plurality of sub-pixels 113. Referring to FIG. 5, each pixel unit 112 includes four sub-pixels (i.e. sub-pixel 1131, sub-pixel 1132, sub-pixel 1133 and sub-pixel 1134). According to embodiments of the present invention, in a direction parallel to gate lines, a source line is saved in each pixel unit 112, and the saved source line may be the one which is disposed between any two adjacent sub-pixels 113 of the pixel unit 112. As illustrate in FIG. 5, along a direction parallel to the gate lines, each column of pixel units 113 correspond to a touch driving line 114, and the touch driving line is disposed between adjacent two sub-pixels 1133 and 1134 of the pixel unit 112. A source line between the sub-pixel 1133 and sub-pixel 1134 is used as a touch driving line 114 in FIG. 5. The touch driving line 114 is electrically connected with a respective touch driving electrode 111 to provide a touch scan signal to the respective touch driving electrode 111. Other source lines are used as data lines 115 to provide data signals to sub-pixels (i.e. sub-pixel 1131, sub-pixel 1132, sub-pixel 1133 and sub-pixel 1134). Since the source line between the sub-pixel 1133 and sub-pixel 1134 of each pixel unit 112 is saved and is used as a touch driving line 114, it is required that the sub-pixel 1132 and the sub-pixel 1133 adjacent to the sub-pixel 1132 in each pixel unit 112 share the same one source line and use the source line as a data line. Since the sub-pixels 1132 and 1133 share one data line, the sub-pixels 1132 and 1133 are driven by different gate lines respectively. Referring to FIG. 5, the sub-pixel 1131 in each pixel unit 112 uses a separate source line as a data line 15, and both the sub-pixel 1132 and sub-pixel 133 in each pixel unit 112 share a source line and use the source line as a data line 115. The sub-pixel 1134 in each pixel unit 112 use a separate source line as a data line 115.

Figure 6:
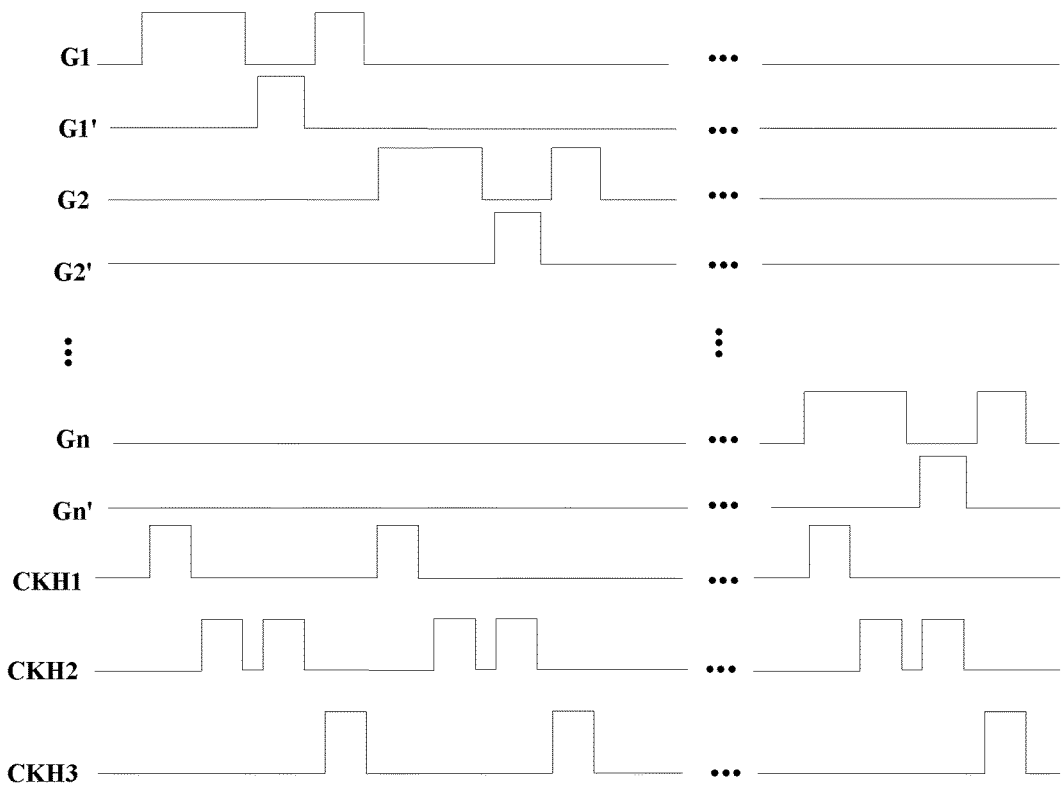
FIG. 6 is a schematic driving time sequence diagram of the touch display device as shown in FIG. 5.

FIG. 6 is a driving schematic time sequence diagram of the touch display device in FIG. 5. A driving period of each frame is described in combination with FIG. 5 and FIG. 6.

At a first stage, the gate line G1 is at a high level, and when a first clock signal CKH1 is at a high level, data signals are inputted to the first row of sub-pixels 1131 by the data lines 115 so as to drive the first row of sub-pixels 1131 for display.

At a second stage, the gate line G1 is at a high level, and when a second clock signal CKH2 is at a high level, data signals are inputted to the first row of sub-pixels 1132 by the data lines 115 so as to drive the first row of sub-pixels 1132 for display. Meanwhile, since a gate line G1' is at a low level, the sub-pixel 1133s connected with gate line G1' does not receive data signals provided by the data lines 115.

At a third stage, the gate line G1' is at a high level, and when the second clock signal CKH2 is at a high level, data signals are inputted to the first row of sub-pixels 1133 by the data lines 115 so as to drive the first row of sub-pixels 1133 for display. Meanwhile, since the gate line G1 is at a low level, the sub-pixels 1132 connected with the gate line G1 do not receive data signals provided by the data lines 115.

At a fourth stage, the gate line G1 is at a high level, and when a third clock signal CKH3 is at a high level, data signals are inputted to the first row of sub-pixel 1134s by the data lines 115 so as to drive the first row of sub-pixels 1134 for display.

So far, display of the first row of sub-pixels is completed. Similarly, within a driving period of one frame picture, display and driving from the second row of sub-pixels to the n-th row of sub-pixels are controlled by the above four stages to sequentially complete the display of each row of the sub-pixels. The touch display panel in FIG. 5 can realize that a source line is remained and used as a data line in each pixel unit.

Figure 7:
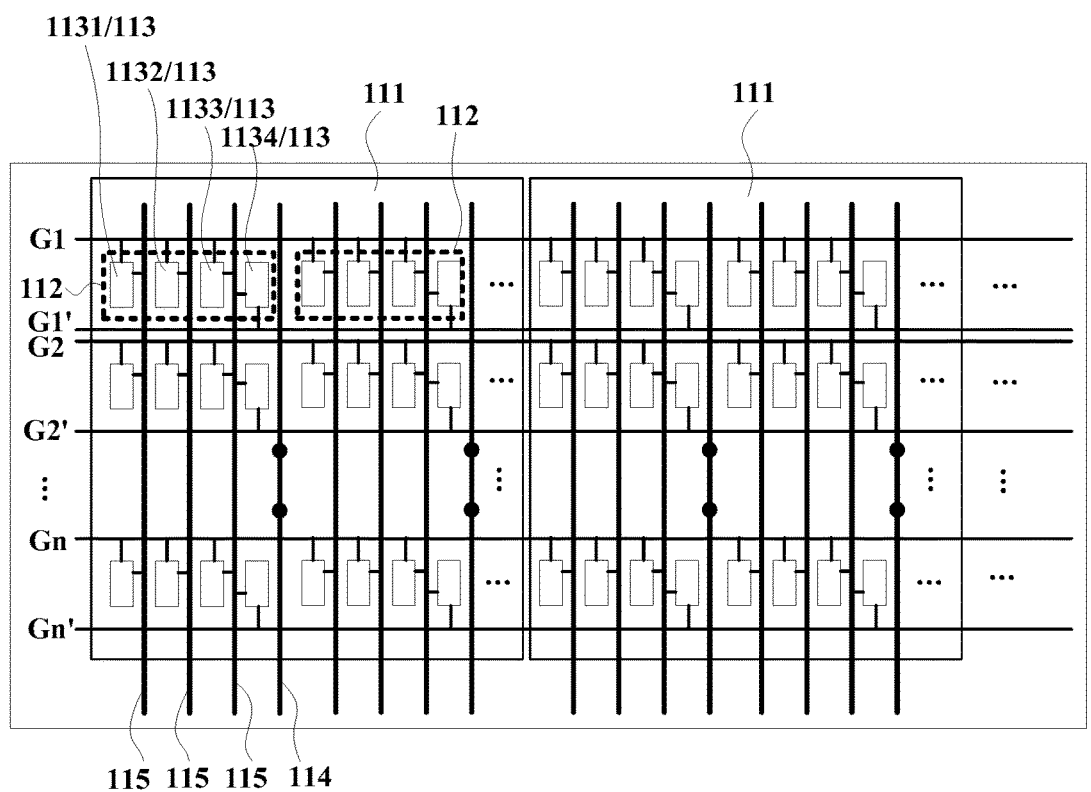
FIG. 7 is a schematic top view showing a structure of still another touch display panel according to embodiments of the present invention.

FIG. 7 is a schematic top view showing a structure of still another touch display panel according to embodiments of the present invention. As illustrated in FIG. 7, each row of sub-pixels 113 are driven by two gate lines in a time division manner. The first row of sub-pixels 113 are driven by a gate line G1 and a gate line G1' in a time division manner. The second row of sub-pixels 113 are driven by a gate line G2 and a gate line G2' in a time division manner. The third row of sub-pixels 113 are driven by a gate line G3 and a gate line G3' in a time division manner. The n-th row of sub-pixels 113 are driven by a gate line Gn and a gate line Gn' in a time division manner. A touch display device according to embodiments of the present invention includes a plurality of pixel units 112 arranged in a matrix manner. Each of the plurality of pixel units 112 includes a plurality of sub-pixels 113. Referring to FIG. 7, each of the plurality of pixel units 112 includes four sub-pixels (i.e. sub-pixel 1131, sub-pixel 1132, sub-pixel 1133 and sub-pixel 1134). Being different from FIG. 5, in a direction parallel to the gate lines, the touch driving lines 114 are spaced apart from the pixel units 112 in each row. The touch driving line is arranged between two adjacent pixel units 112 in a column direction. The sub-pixel 1131 and the sub-pixel 1132 in each pixel unit 112 use a separate source line as a data line 115, respectively. The sub-pixel 1133 and the sub-pixel 1134 share a same data line. Therefore, the sub-pixel 1132 and the sub-pixel 1133 are driven by different gate lines.

Figure 8:
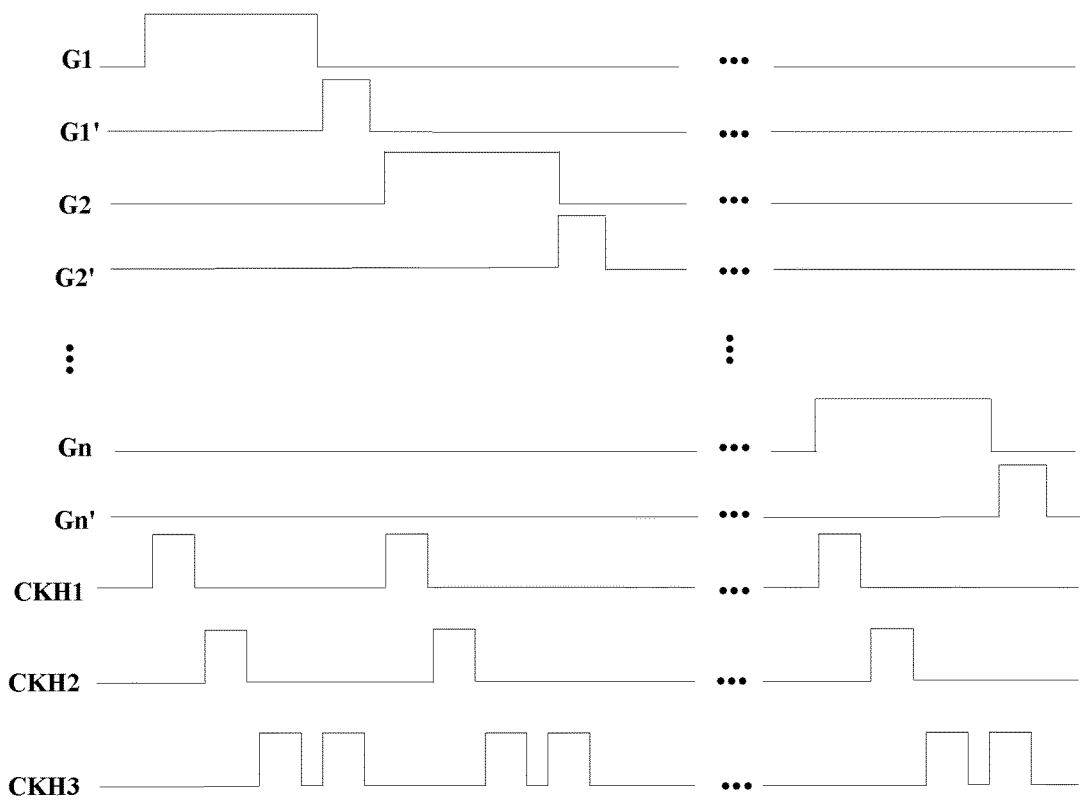
FIG. 8 is a schematic driving time sequence diagram of the touch display device as shown in FIG. 7.

FIG. 8 is a schematic driving time sequence diagram of the touch display device in FIG. 7. A driving period of each frame is described in combination with FIG. 7 and FIG. 8.

At a first stage, the gate line G1 is at a high level and when the first clock signal CKH1 is at high level. A data signal is inputted to sub-pixel 1131 of the first row via data line 115, and sub-pixel 1131 of the first row is driven to display.

At a second stage, the gate line G1 is at high level and when the second clock signal CKH2 is at high level. A data signal is inputted to sub-pixel 1132 of the first row via data line 115, and sub-pixel 1132 of the first row is driven to display.

At a third stage, the gate line G1 is at high level and when the third clock signal CKH3 is at high level. A data signal is inputted to sub-pixel 1133 of the first row via data line 115, and sub-pixel 1133 of the first row is driven to display. Meanwhile, since a low-level voltage is applied to gate line G1', sub-pixel 1134 connected to the gate line G1' does not receive the data signal provided by data line 115.

At a fourth stage, the gate line G1' is at a high level and when the third clock signal CKH3 is at a high level. A data signal is inputted to sub-pixel 1134 of the first row via data line 115, and sub-pixel 1134 of the first row is driven to display. Meanwhile, since a low-level voltage is applied to gate line G1, sub-pixel 1133 connected to gate line G1 does not receive data signal provided by data line 115.

The display of the first row sub-pixels is completed now. Similarly, in the period of each frame image, form the second row of sub-pixels to the n-th row of sub-pixels are driven to display according to the above four stages, so that each row of sub-pixels are controlled to display sequentially. A source line is also remained and used as touch driving line in each pixel unit according to touch display panel in FIG. 7.

Figure 9:
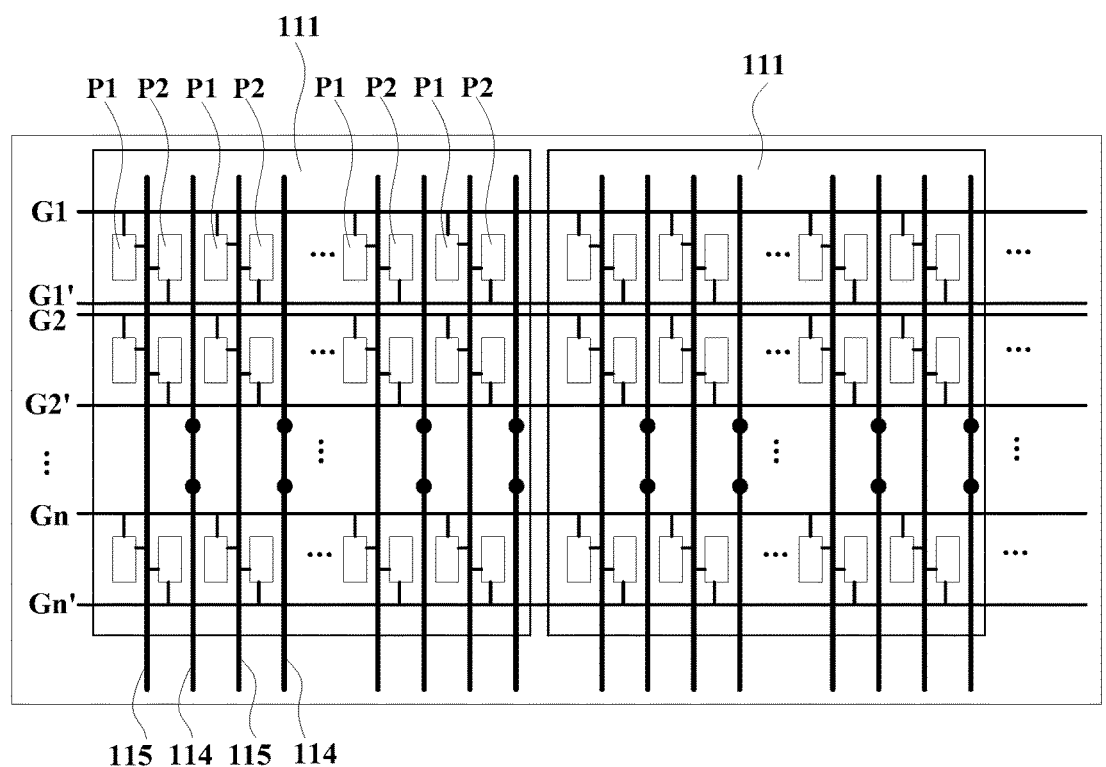
FIG. 9 is a schematic top view showing a structure of still another touch display panel according to embodiments of the present invention.

FIG. 9 is a schematic driving time sequence diagram of still another touch display panel according to embodiments of the present invention. As illustrated in FIG. 9, each row of sub-pixels 113 is driven by two gate lines in a time division manner. The first row sub-pixels 113 of the first row are driven by gate line G1 and gate line G1' in a time division manner. Second row of sub-pixels 113 is driven by gate line G2 and gate line G2' in a time division manner. The third row of sub-pixels 113 is driven by gate line G3 and gate line G3' in a time division manner. The n-th row of sub-pixels 113 is driven by gate line Gn and gate line Gn' in a time division manner. Along a direction parallel to the gate lines, the touch driving lines 114 are spaced apart from two sub-pixels 113 in each row. For convenient description, two sub-pixels sharing the same data line are marked as P1 and P2 respectively.

Figure 10:
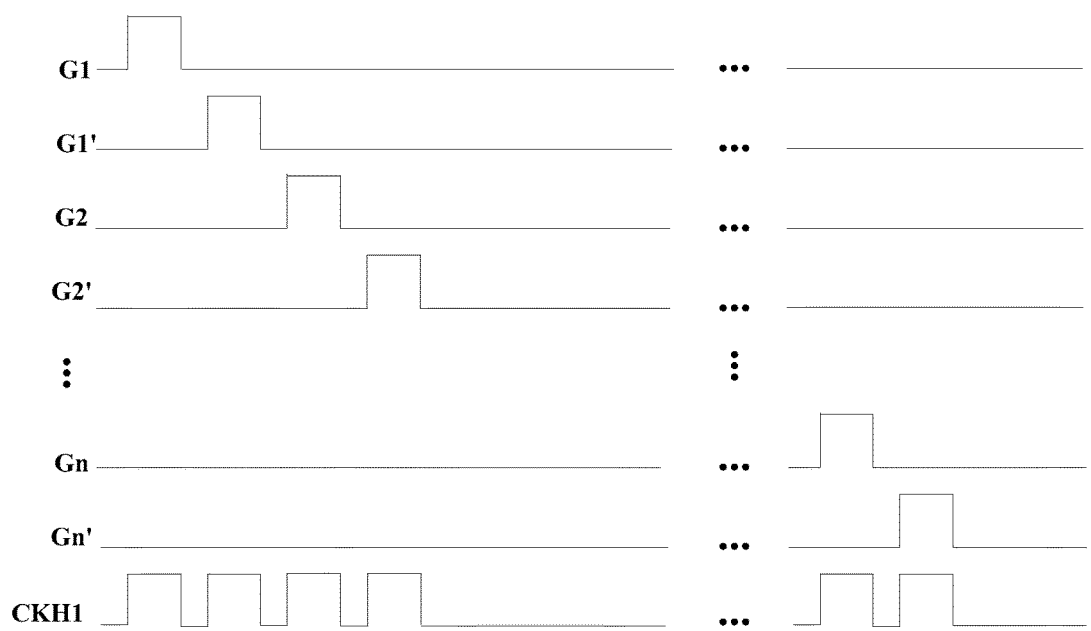
FIG. 10 is a schematic driving time sequence diagram of the touch display device as shown in FIG. 9.

FIG. 10 is a schematic driving time sequence diagram of the touch display device in FIG. 9. A driving period of each frame is disclosed in combination with FIG. 9 and FIG. 10.

At a first stage, a gate line G1 is at a high level, and when a first clock signal CKH1 is at a high level, data signals are inputted to the first row of sub-pixels P1 by data lines 115 so as to drive the first row of sub-pixels P1 for display. Meanwhile, although sub-pixels P2 share the data lines 115, but a gate line G1' is at a low level, the sub-pixels P2 connected with the gate line G1' do not receive data signals provided by the data lines 115.

At a second stage, the gate line G1' is at a high level, and when the first clock signal CKH1 is at a high level, data signals are inputted to the first row of sub-pixels P2 by the data lines 115 so as to drive the first row of sub-pixels P2 for display. Meanwhile, the gate line G1 is at a low level, the sub-pixels P1 do not receive data signals provided by the data lines 115.

So far, the display of the first row of sub-pixels is completed now. Similarly, in the period of each frame image, sub-pixels of the second row to sub-pixels of the nth row are driven to display according to the above two stages, so that sub-pixels of each row are controlled to display sequentially.

Optionally, colors of sub-pixels of each pixel unit can include red (R), green (G) and blue (B), that is, the pixel unit can includes a red sub-pixel, a green sub-pixel and a blue sub-pixel, thereby realizing the display for colorful images. A color arrangement of sub-pixels in each pixel unit is not limited to RGB manner. For instance, the color arrangements may include RBG, GBR, GRB, BRG or BGR manner. The number of sub-pixels in each pixel unit is not limited in the present disclosure. In the above embodiments as illustrated in FIGS. 5 and 7, exemplarily, each pixel unit can include four sub-pixels, which is not used to limit the disclosure. If each pixel unit can include three sub-pixels, and in a direction parallel to gate lines, the touch driving lines are spaced apart from the pixel units, the respective figures can be referred to FIGS. 1A and 3. When each pixel unit may include four sub-pixels, the colors displayed by the four sub-pixels may be red (R), green (G), blue (B) and white color (W), respectively, that is, each pixel unit may include a red sub-pixel, a green sub-pixel, a blue sub-pixel, and a white sub-pixel.

Figure 11:
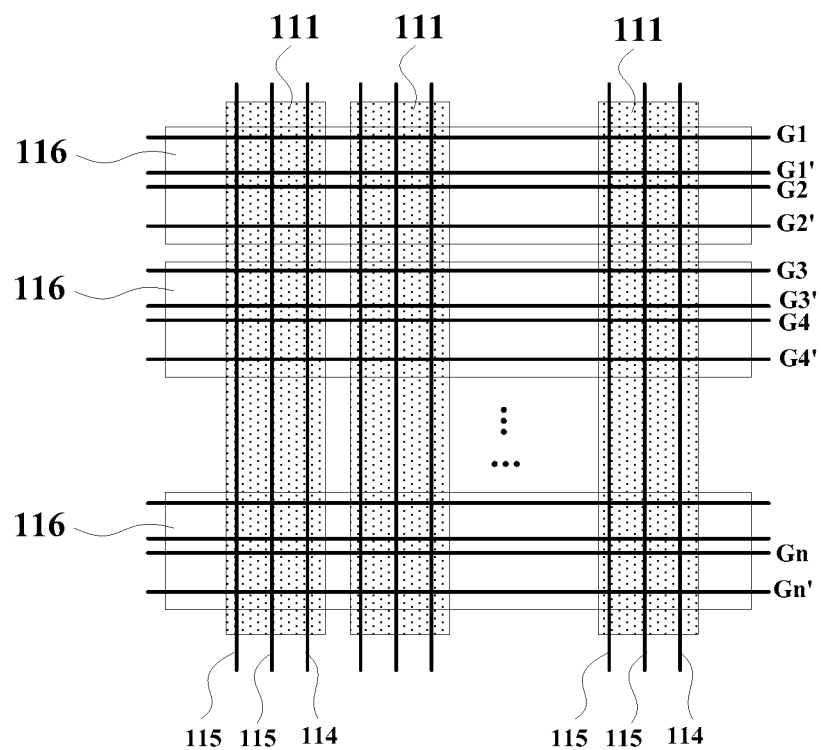
FIG. 11 is a schematic top view showing a structure of still another touch display panel according to embodiments of the present invention.

On the basis of the above embodiments, optionally, the color filter substrate of a touch display is further provided with a plurality of touch sensing electrodes. As illustrated in FIG. 11, the touch driving electrodes 111 extend in a direction parallel to source lines (data lines 115 or touch driving lines 114), and touch sensing electrodes 116 extend in a direction parallel to gate lines (gate lines G1 to Gn). The touch driving electrodes 111 and touch sensing electrodes 116 may achieve mutual capacitance touch detection. As for the mutual capacitance, when a touch scan signal is sequentially inputted to each touch driving electrode 111, the touch sensing electrode 116 outputs a touch sensing signal, a capacitance is formed between the touch driving electrode 111 and touch sensing electrode 116. When a touch occurs, coupling between the touch driving electrode 111 and touch sensing electrode 116 near a touch point are affected, therefore, the number of capacitances between the touch driving electrode 111 and touch sensing electrode 116 are changed. A method for detecting the position of a touch point includes: sequentially inputting a touch scan signal to each touch driving electrode 111 and simultaneously outputting, by the touch sensing electrode, touch sensing signals. As a result, the size of capacitance values of all intersections between the touch driving electrodes 111 and touch sensing electrodes 116 can be obtained, that is, a capacitance value of two dimensional planes of the entirely integrated touch display device is obtained. Therefore, coordinates of touch points can be calculated according to data of variations of two dimensional capacitance of the touch display device.

Since touch driving lines are required for providing touch scan signals to the touch driving electrodes, each of the touch driving electrodes is electrically connected with at least one of the touch driving lines. To avoid the contact failure caused by fracture of single touch driving line, optionally, it is arranged that each of the touch driving electrodes is electrically connected with a plurality of touch driving lines.

On the basis of the above embodiments, optionally, the touch driving electrodes may be multiplexed as a common electrode, and the common electrode is divided into a plurality of touch driving electrodes. Each of the touch driving lines electrically connected with one of the plurality of touch driving electrodes is used to provide a common electrode signal and a touch scan signal to the touch driving electrodes in a time division manner. When the touch driving electrodes can be arranged to be multiplexed as the common electrode, a thickness of the touch display device may be further reduced. In addition, since the touch driving electrodes are multiplexed as the common electrode, only one etch process is required in the fabricating process without preparing masks for the touch driving electrode and the common electrode respectively, thereby reducing the number of processes, reducing the cost and improving productivity.

A touch driving electrode layer may be a transparently conductive electrode such as Indium Tin Oxide. An insulated layer is provided between the touch driving electrode layer and the touch driving lines. Each of the touch driving electrodes may be electrically connected with one of the respective touch driving lines via at least one through hole which penetrates the insulated layer. In order to reduce a touch resistance, optionally, each of the touch driving electrodes can be arranged to be electrically connected with one of the corresponding touch driving lines via one of the plurality of through holes which penetrate through the insulated layer.

Figure 12:
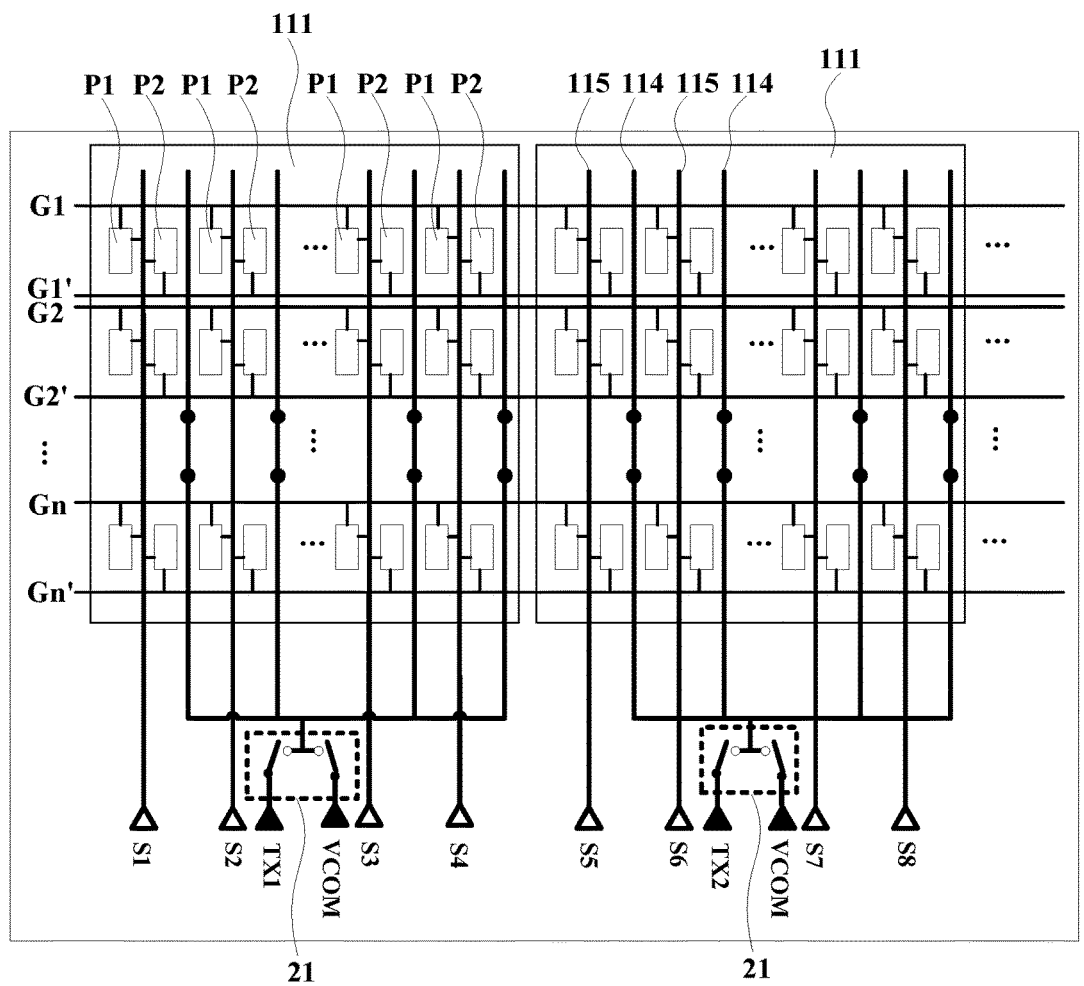
FIG. 12 is a schematic view showing a structure of another touch display device according to embodiments of the present invention.

In a case where a common electrode is multiplexed as touch driving electrodes, it is required that touch scan signals are provided to touch driving electrodes during a touch stage, and a common electrode signal is provided to the touch driving electrodes during a display stage. FIG. 12 is a schematic view showing a structure of still another touch display device according to embodiments of the present invention. As illustrated in FIG. 12, a touch driving device may further include a first selection circuit 21. One terminal of the first selection circuit 21 is electrically connected with a corresponding touch scan signal interface TXi (i indicates a serial number of the touch scan signal interface, and i is a positive integer) of a driving chip and a common voltage signal interface VCOM, the other terminal of the first selection circuit 21 is electrically connected with corresponding touch driving lines 114. The first selection circuit 21 transmits, under the control of the driving chip, a touch scan signal and a common electrode signal to a touch driving electrode 111 in a time division manner via the touch driving line 114 electrically connected with the touch driving electrode 111. The driving period of each frame includes a display stage and a touch stage. During the display stage, the first selection circuit 21 receives a common electrode signal transmitted by the common voltage signal interface VCOM and provides the common electrode signal to the touch driving electrodes for realizing a display function; during the touch stage, the first selection circuit 21 receives a touch scan signal transmitted by the touch scan signal interface TXi and provides the touch scan signal to the touch driving electrodes for realizing a touch function. Each data line 115 is electrically connected with one of the corresponding data signal interfaces Sj (j indicates a serial number of the data signal interface, and j is a positive integer) of the driving chip. Under the control of a plurality of clock signals, a data signal is inputted to sub-pixels corresponding to the data signal interface Sj via a respective data line 115.

Figure 13:
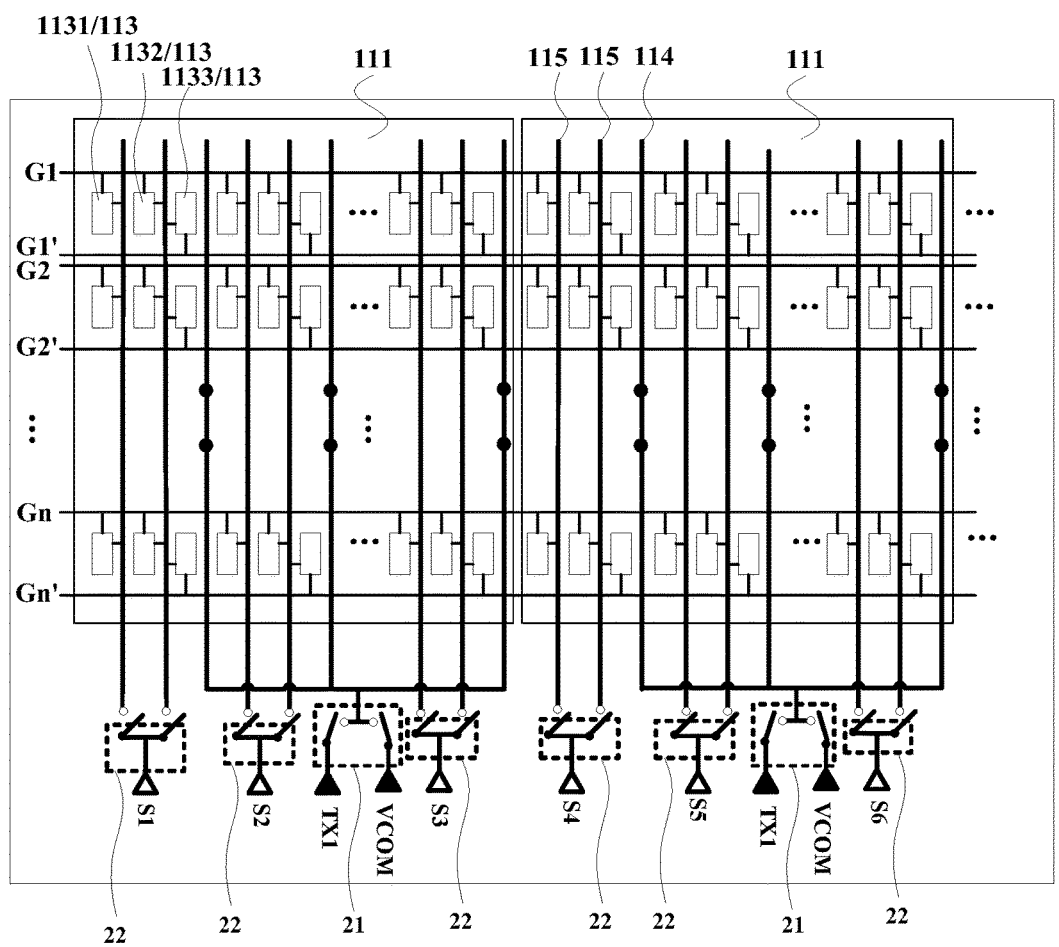
FIG. 13 is a schematic view showing a structure of still another touch display device according to embodiments of the present invention.

FIG. 13 is a schematic view showing a structure of still another touch display device according to embodiments of the present invention. As illustrated in FIG. 13, a touch display device may further include a first selection circuit 21 and a second selection circuit 22. One terminal of the first selection circuit 21 is electrically connected with a respective touch scan signal interface TXi of a driving chip and a common voltage signal interface VCOM, the other terminal of the first selection circuit 21 is electrically connected with corresponding touch driving lines 114. The first selection circuit 21 transmits, under the control of the driving chip, a touch scan signal and a common electrode signal to a touch driving electrode 111 in a time division manner via the touch driving lines 114. One terminal of the second selection circuit 22 is electrically connected with a corresponding data signal interface Sj of the driving chip, and the other terminal of the second selection circuit 22 is electrically connected with corresponding data lines. The second selection circuit 22 transmits, under the control of a plurality of clock signals, a data signal to corresponding sub-pixels via a respective data line 115.

Note that, each of the first selection circuit 21 and the second selection circuit 22 may include a plurality of switch components such as thin film transistors. The switch components in the first selection circuit 21 and the second selection circuit 22 may be turned on and turned off under the control of a plurality of clock signals. The first selection circuit 21 can transmit, under the control of a plurality of clock signals, a common electrode signal and a touch scan signal in a time division manner. The second selection circuit 22 can select, under the control of a plurality of clock signals, a data line to provide a data signal to a sub-pixel corresponding to the data line, thus it can be realized that each row of sub-pixels are driven in a time division manner.

Note that, FIGS. 1A to 13 contain numerous same parts, the same parts are identified by same reference numerals in succeeding Figures, and the same contents will be omitted.

The foregoing description provides preferred embodiments and technical principles of the present disclosure. As will be understood by those skilled in the art, the present disclosure is not limited to specific embodiments. Various changes, modifications and substitution may be made by one skilled in the art will fall in by the protection scope of the following claims of the present disclosure. Thus, although the present disclosure is described in detail through aforementioned embodiments, the present is not limited to the aforementioned embodiments. Other and further equivalent embodiments may be achieved without departing from the inventive concept of the present disclosure.

What is claimed is:

1. A touch display device, comprising an array substrate and a color filter substrate opposite to the array substrate;
   the array substrate comprises
      a plurality of touch driving electrodes, and
      a plurality of sub-pixels defined by a plurality of source lines and a plurality of gate lines insulated from and intersected with the plurality of source lines, wherein each row of the sub-pixels is driven by two gate lines in a time division manner; and, wherein
         the plurality of source lines comprise data lines and touch driving lines, the touch driving lines being connected with the touch driving electrodes and being configured to provide touch scan signals to the touch driving electrodes;
         the data lines are configured to provide data signals for the respective sub-pixels; and
         in each row of sub-pixels, two adjacent sub-pixels connected to a same data line are connected with different gate lines, and two adjacent sub-pixels connected to a same gate line are connected with different data lines.

2. The touch display device according to claim 1, wherein the color filter substrate comprises a plurality of touch sensing electrodes; the plurality of touch driving electrodes extend in a direction parallel to the source lines, and the plurality of touch sensing electrodes extend in a direction parallel to the gate lines.

3. The touch display device according to claim 1, wherein the sub-pixel comprises a red sub-pixel, a green sub-pixel and a blue sub-pixel.

4. The touch display device according to claim 1, wherein the plurality of touch driving electrodes are multiplexed as a common electrode, and each of the touch driving lines electrically connected with one of the plurality of touch driving electrodes is configured to transmit a common electrode signal and a touch scan signal to the respective one of the plurality of touch driving electrodes in a time division manner.

5. The touch display device according to claim 4, wherein the touch driving lines are spaced apart from three sub-pixels in a direction parallel to the gate lines.

6. The touch display device according to claim 5, further comprising a first selection circuit, wherein one terminal of the first selection circuit is electrically connected with a corresponding touch scan signal interface of a driving chip and a common voltage signal interface, the other terminal of the first selection circuit is electrically connected with corresponding touch driving lines; and
   wherein the first selection circuit transmits, under the control of the driving chip, the common electrode signal and the touch scan signal to a touch driving electrode electrically connected with the touch driving electrode in a time division manner via the touch driving line.

7. The touch display device according to claim 4, wherein the touch driving lines are spaced apart from four sub-pixels in a direction parallel to the gate lines.

8. The touch display device according to claim 7, further comprising a first selection circuit and a second selection circuit, wherein
   one terminal of the first selection circuit is electrically connected with a respective touch scan signal interface of a driving chip and a common voltage signal interface, the other terminal of the first selection circuit is electrically connected with corresponding touch driving lines;
   the first selection circuit is configured to transmit, under the control of the driving chip, the common electrode signal and the touch scan signal to a touch driving electrode in a time division manner via a touch driving line electrically connected with the touch driving electrode; and
   one terminal of the second selection circuit is electrically connected with a corresponding data signal interface of the driving chip, the other terminal of the second selecting circuit is electrically connected with corresponding data lines, and the second selection circuit is configured to transmits, under the control of the driving chip, data signals to the plurality of sub-pixels via the plurality of data lines respectively.

9. The touch display device according to claim 4, wherein the plurality of sub-pixels are divided into a plurality of pixel units arranged in a matrix, each column of pixel units corresponds to a touch driving line in a direction the parallel to the gate lines;
   wherein the touch driving line is disposed between two adjacent sub-pixels of each pixel unit.

10. The touch display device according to claim 9, further comprising a first selection circuit and a second selection circuit, wherein
    one terminal of the first selection circuit is electrically connected with a respective touch scan signal interface of a driving chip and a common voltage signal interface, the other terminal of the first selection circuit is electrically connected with corresponding touch driving lines;
    the first selection circuit is configured to transmits, under the control of the driving chip, the common electrode signal and the touch scan signal to a touch driving electrode in a time division manner via a touch driving line electrically connected with the touch driving electrode; and
    one terminal of the second selection circuit is electrically connected with a corresponding data signal interface of the driving chip, the other terminal of the second selecting circuit is electrically connected with corresponding data lines, and the second selection circuit is configured to transmits, under the control of the driving chip, data signals to the plurality of sub-pixels via the plurality of data lines respectively.

11. The touch display device according to claim 9, wherein each of the plurality of pixel units comprises four sub-pixels.

12. The touch display device according to claim 4, wherein the plurality of sub-pixels are divided into a plurality of pixel units arranged in a matrix, each column of pixel units corresponds to a touch driving line in a direction the parallel to the gate lines;
wherein the touch driving line is disposed between two adjacent columns of pixel units.

13. The touch display device according to claim 12, further comprising a first selection circuit and a second selection circuit, wherein
one terminal of the first selection circuit is electrically connected with a respective touch scan signal interface of a driving chip and a common voltage signal interface, the other terminal of the first selection circuit is electrically connected with corresponding touch driving lines;
the first selection circuit is configured to transmits, under the control of the driving chip, the common electrode signal and the touch scan signal to a touch driving electrode in a time division manner via a touch driving line electrically connected with the touch driving electrode; and
one terminal of the second selection circuit is electrically connected with a corresponding data signal interface of the driving chip, the other terminal of the second selecting circuit is electrically connected with corresponding data lines, and the second selection circuit is configured to transmits, under the control of the driving chip, data signals to the plurality of sub-pixels via the plurality of data lines respectively.

14. The touch display device according to claim 12, wherein each of the plurality of pixel units comprises four sub-pixels.

15. The touch display device according to claim 1, wherein each of the plurality touch driving electrodes is electrically connected with at least one of the touch driving lines.

16. The touch display device according to claim 1, wherein an insulated layer is provided between the touch driving lines and the touch driving electrodes, and each of the touch driving electrodes is electrically connected with one of the respective touch driving lines via at least one through hole which penetrates the insulated layer.

\* \* \* \* \*